United States Patent [19]

Kitamoto et al.

[11] Patent Number: 4,588,656
[45] Date of Patent: May 13, 1986

[54] METHOD OF PREPARING A MAGNETIC RECORDING MEDIUM

[75] Inventors: Tatsuji Kitamoto; Ryuji Shirahata; Yasuyuki Yamada; Goro Akashi, all of Odawara, Japan

[73] Assignee: Fuji Photo Film Co., Ltd., Minami-ashigara, Japan

[21] Appl. No.: 352,462

[22] Filed: Feb. 25, 1982

[30] Foreign Application Priority Data

Feb. 27, 1981 [JP] Japan .................. 56-28195

[51] Int. Cl.⁴ .............................. H01F 10/02
[52] U.S. Cl. .................. 428/694; 427/131; 427/132; 427/250; 427/44; 428/900
[58] Field of Search ............... 427/127–132, 427/48, 44, 250; 428/900, 694, 695

[56] References Cited

U.S. PATENT DOCUMENTS

| | | | |
|---|---|---|---|
| 2,671,034 | 3/1954 | Steinfeld | 117/71 |
| 3,329,601 | 7/1967 | Mattox | 204/298 |
| 3,342,632 | 9/1967 | Bate et al. | 117/217 |
| 3,342,633 | 9/1967 | Bate et al. | 117/217 |
| 3,516,860 | 6/1970 | Simmons | 117/236 |
| 3,615,911 | 10/1971 | Nesbitt et al. | 148/31.57 |
| 3,625,849 | 12/1971 | Rogalla | 204/192 |
| 3,700,500 | 10/1972 | Rodbell et al. | 117/239 |
| 3,772,174 | 11/1973 | Spalvins | 204/192 |
| 3,772,179 | 11/1973 | Beer | 204/197 |
| 3,787,237 | 1/1974 | Grunberg et al. | 117/239 |
| 3,856,579 | 12/1974 | Allen et al. | 148/103 |
| 3,993,824 | 11/1976 | Shirahata et al. | 423/216 |
| 4,171,399 | 10/1979 | Allen et al. | 427/131 X |
| 4,188,434 | 2/1980 | Loran | 427/131 |
| 4,239,835 | 12/1980 | Fijima et al. | 427/132 X |

OTHER PUBLICATIONS

"Vacuum Deposition of Thin Film", L. Holland, Chapman and Hall Ltd., 1956.
"Handbook of Thin Film Technology", L. I. Maissel and R. Glang, McGraw-Hill Co., 1970.

Primary Examiner—Bernard D. Pianalto
Attorney, Agent, or Firm—Fleit, Jacobson, Cohn & Price

[57] ABSTRACT

A magnetic recording medium comprising a substrate, a thin magnetic metal film having spaced-apart columnar grains deposited on the substrate, and an organic polymer formed in the space between the columnar grains and integrated therewith. The medium is prepared by impregnating the spaces between the columnar grains with organic monomers or oligomers and polymerizing them in the spaces.

14 Claims, 1 Drawing Figure

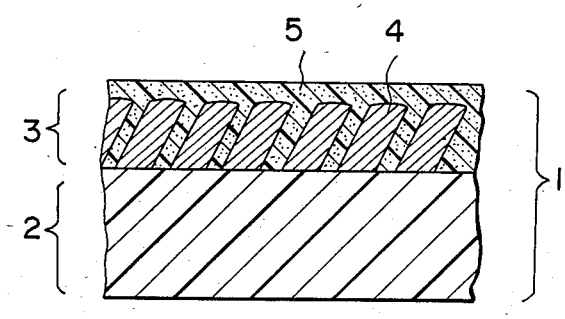

METHOD OF PREPARING A MAGNETIC RECORDING MEDIUM

BACKGROUND OF THE INVENTION

1. Field of the Invention

This invention relates to an improvement in a magnetic recording medium having a magnetic thin film recording layer formed by the vapor deposition process, and more particularly to a vapor deposition type magnetic recording medium showing improved durability, and a method of preparation thereof.

2. Description of the Prior Art

Coating type magnetic recording media are widely used. These magnetic recording media use powdered magnetic materials such as magnetic oxide particles and ferromagnetic alloy particles, for example, $\gamma\text{-}Fe_2O_3$, Co-modified $\gamma\text{-}Fe_2O_3$, $Fe_3O_4$, Co-modified $Fe_3O_4$, Berthollide compounds; intermediate compound between $\gamma\text{-}Fe_2O_3$ and $Fe_3O_4$, $CrO_2$ or the like. These powdered magnetic materials are dispersed in organic binders such as vinyl chloride - vinyl acetate copolymers, styrene-butadiene copolymers, epoxy resins and polyurethane resins. The dispersions thus obtained are then applied in coats on non-magnetic substrates and dried to form the magnetic recording media. Recently, because of their ability to meet strong demand for high density recording, so-called thin metal film type magnetic recording media using no binders have attracted attention. The magnetic recording media of this type have magnetic recording layers which consist of ferromagnetic metal thin films formed by a vapor deposition process such as vacuum deposition, sputtering and ion plating, or a plating process such as electroplating and electroless plating. Thus various efforts are being made to develop thin metal film type magnetic recording media suitable for practical use.

In the conventional coating type magnetic recording media, metal oxides showing low saturation magnetization are mainly used as the magnetic material. If the thickness of the magnetic layer on substrate is reduced, the signal output level also drops because of low saturation magnetization. Therefore, it is impossible to reduce the thickness of the magnetic layer to such an extent as required for the high density recording. In addition, the coating type magnetic recording media are also disadvantageous in that they require complicated production processes and bulky equipment for the recovery of solvents or for pollution control. On the other hand, the thin metal film type magnetic recording media can be provided with extremely thin magnetic films. In this type of magnetic recording media, ferromagnetic metals showing higher saturation magnetization than metal oxides can be formed as thin films on substrates without using non-magnetic materials such as binders. Among the thin metal film type magnetic recording media, a vapor deposition type magnetic recording medium having a magnetic film formed from a magnetic material in vapor phase is advantageous because the magnetic film can be formed at a high speed, because the production process is simple and because the no treatment steps for the disposal of waste liquor are necessary.

However, the vapor deposition type magnetic recording medium involves certain problems, one of which is that concerning the impact and friction strength. That is, the recording layer of the medium is sometimes broken by contact with a magnetic head or a guide roll when moved relative to the magnetic head or the guide roll during the recording, reproducing and erasing process. In addition, when the vapor deposition type magnetic recording medium is exposed to high temperature and humidity for long periods of time, the magnetic layer sometimes peels off or the bond strength decreases due to the corrosive effects of such an environment to such an extent that the magnetic recording medium cannot be used any more.

To solve the above described problem of the vapor deposition type magnetic recording medium, an attempt has been made to apply an overcoat, which has a thickness of about $0.2\mu$ and is made of a high-molecular weight material in a film form, onto the recording layer. However, this method is not desirable because the output level of the magnetic signal decreases in the case of high density recording due to the space loss which is caused by the thickness of the overcoat. If the thickness of the overcoat is reduced to minimize the space loss, the magnetic recording medium becomes less durable and cannot satisfactorily be used in practical applications. Further, the effect of the overcoat to provide durability deteriorates when the magnetic recording medium is used over long periods of time.

SUMMARY OF THE INVENTION

The object of the present invention is to provide a vapor deposition type magnetic recording medium which shows excellent durability and can eliminate the disadvantages of the conventional magnetic recording media as described above.

Another object of the present invention is to provide a vapor deposition type magnetic recording medium which can retain the effect of the improvement in durability for long periods of time.

A further object of the present invention is to provide a vapor deposition type magnetic recording medium which is extremely thin and yet shows excellent durability.

A still further object of the present invention is to provide a vapor deposition type magnetic recording medium which is extremely durable and yet exhibits the magnetic characteristics desirable of a high density magnetic recording medium.

An even further object of the present invention is to provide a method of preparing an extremely durable vapor deposition type magnetic recording medium in a simple manner.

The inventors studied the thin metal film magnetic recording medium and found that the durability thereof can be improved remarkably if a magnetic film having columnar grain structures is vapor-deposited on a substrate, the spaces between the columnar grain structures are impregnated with an organic monomer or oligomer in the liquid form, and then the organic monomer or oligomer is polymerized in the spaces between the columnar grain structures. It was also found that the effect of the improved durability could be retained for long periods of time.

Accordingly, the present invention provides a magnetic recording medium comprising a substrate, a thin ferromagnetic metal film which has the spaced-apart columnar grain structures formed on the substrate, and an organic polymer formed at least in the spaces between the columnar grain structures and integrated with the thin ferromagnetic metal film.

The present invention also provides a method of preparing a magnetic recording medium which comprises vapor-depositing a thin ferromagnetic metal film with spaced-apart columnar grain structures onto a substrate, impregnating the spaces between the columnar grain structures with at least one organic monomer or oligomer in the liquid form, and then polymerizing the monomer or oligomer at least in the spaces between the columnar grain structures.

BRIEF DESCRIPTION OF THE DRAWING

The figure is a schematic view showing an embodiment of the magnetic recording medium according to the present invention.

DESCRIPTION OF THE PREFERRED EMBODIMENTS

Now the present invention will be described in detail with reference to the drawing.

Referring to the figure showing an embodiment of the magnetic recording medium according to the present invention, a magnetic recording medium 1 consists of a non-magnetic substrate 2 and a magnetic metal thin film layer 3 formed thereon by the vapor deposition process. The magnetic metal thin film layer 3 comprises columnar grain structures 4, and a polymer 5 in the gaps between the columnar grain structures 4.

The term "vapor deposition process" as used herein means a process in which a material or a compound thereof to be deposited is converted into vapor or ionized vapor and deposited onto a substrate in a gas or a vacuum. It broadly embraces the vacuum deposition, sputtering, ion plating and chemical vapor deposition processes and the like.

The conditions under which the vapor deposition process is carried out differ largely according to the method and the material used. The main treatment conditions for the different methods are as listed in Table 1 below.

i—W, Co—Ni—Re, Co—Sm—Cu, or the like. The thickness of the ferromagnetic metal layer for use in the magnetic recording medium generally ranges from $0.05\mu$ to $2\mu$, preferably from $0.1\mu$ to $0.4\mu$.

Formation of the ferromagnetic metal layer as described above by the vapor deposition process is described for example by L. Holland in "Vacuum Deposition of Thin Film" (Chapman & Hall Ltd., 1956), L. I. Maissel & R. Glang in "Handbook of Thin Film Technology" (McGraw-Hill Co., 1970), and in U. S. Pat. Nos. 2,671,034, 3,329,601, 3,342,632, 3,342,633, 3,516,860, 3,615,911, 3,625,849, 3,700,500, 3,772,174, 3,772,179, 3,787,237, and 3,856,579.

The oblique incidence deposition process is particularly preferred for the purpose of forming the magnetic metal thin film layer which contains the columnar grain structures spaced apart from each other so as to allow a polymer to intervene therebetween. In the oblique incidence deposition process, a ferromagnetic metal is vaporized and the resulting vapor stream of the ferromagnetic metal is caused to impinge upon a substrate at an oblique angle with respect to the surface of the substrate. In this way, a thin film of the ferromagnetic metal is formed on the substrate. The thin film of the magnetic metal formed by the oblique incidence deposition process not only has columnar grain structures spaced apart from one another but also exhibits those magnetic characteristics which are desirable for a high-density magnetic recording medium. In the oblique incidence deposition, it is preferred that the incident angle of the vapor stream of the ferromagnetic metal be 50° or more. In this case, a film having the columnar grain structures having their longitudinal axes lying at an oblique angle with respect to the surface of a substrate 2 is formed as shown in FIG. 1. Normally, the angle of the longitudinal axes of the formed clumnar grain structures with respect to a line normal to the

TABLE 1

| Conditions | Process | | | | |
|---|---|---|---|---|---|
| | Vacuum deposition | Sputtering | Ion plating | Ion beam deposition | Chemical vapor deposition |
| Pressure of atmosphere in square brackets (Torr) | $\leq 10^{-5}$ | $10^{-2} \sim 10^{-3}$ [Ar] | $10^{-2} \sim 10^{-3}$ [Ar] | $10^{-5} \sim 10^{-6}$ | <1 atm [Ar] |
| Temperature of material | Evaporation temperature | Water cooling | Evaporation temperature | — | >Evaporation temperature |
| Film thickness | ~Several microns | ~Several tens of microns | ~Several tens of microns | ~Several microns | ~Several hundreds of microns |
| Deposition rate (Å/sec) | ~Several hundreds | ~Several hundreds | ~Several hundreds | Several tens ~3000 | $10^2$ |
| Voltage applied | — | Several volts~ several hundreds of volts | Several tens of volts~ 10k V (glow discharge) | ~500 V | — |

The ferromagnetic metal layer to be used as the magnetic recording layer in accordance with the present invention is formed on a supporting layer (or a prime-coating layer) by vapor-depositing the ferromagnetic metals or alloys thereupon in the form of a thin film. Usable ferromagnetic metals include cobalt, nickel or the like. The ferromagnetic alloys may be, for example, Fe—Co, Fe—Ni, Co—Ni, Fe—Si, Fe—Rh, Co—P, Co—B, Co—Si, Co—V, Co—Y, Co—La, Co—Ce, Co—Pr, Co—Sm, Co—Pt, Co—Mn, Fe—Co—Ni, Co—Ni—P, Co—Ni—B, Co—Ni—Ag, Co—Ni—La, Co—Ni—Ce, Co—Ni—Zn, Co—Ni—Cu, Co—N- surface of the substrate is smaller than the incident angle of the vapor stream during the deposition process. The volumetric ratio of the spaces between the columnar grain structures in the thin film layer 3 of magnetic metal may vary from 10% to 60% when the incident angle of the vapor stream is 50° or more.

The monomers, oligomers and polymers used in the present invention may, for example, be olefins or derivatives thereof such as ethylene, propylene, isobutylene and trifluoropropylene; dienes or derivatives thereof such as butadiene and trichlorobutadiene; vinylacetylenes such as vinylacetylene and chlorovinylacetylene;

halogenated ethylenes such as vinyl chloride, vinylidene chloride, dichloroethylene, trichloroethylene and allyl chloride; acrylic acids, methacrylic acids or derivatives thereof such as acrylic acid, methacrylic acid, acrylic morpholine and acrylic pyrrolidine; acrylic esters such as ethyl acrylate, butyl acrylate and allylidene diacrylate; methacrylic esters such as methyl methacrylate, ethyl $\beta$-chloro methacrylate or ethyl $\beta$-ethoxy methacrylate; acrylic amides or derivatives thereof such as acrylamide and N-n-butoxycarbonylacrylamide; methacrylic amides or derivatives thereof such as methacrylamide and N-o-anisylmethacrylamide; acrylonitriles or methacrylonitriles such as acrylonitrile, methacrylonitrile, $\alpha$-chloroacrylonitrile and $\alpha$-ethylacrylonitrile; vinyl esters such as vinyl acetate, vinyl nomochloro acetate and vinyl trifluoro acetate; unsaturated dibasic acids or esters thereof such as methylallyl maleate and vinylethyl fumarate; allyl esters such as allyl acetate and diallyl phthalate; vinylketones or derivatives thereof such as methyl vinyl ketone and divinyl ketone; unsaturated ethers such as allyl vinyl ether, ethyl vinyl ether and divinyl ether; styrenes or derivatives thereof such as styrene, chlorostyrene and methylstyrene; vinylamines or derivatives thereof such as vinyl isocyanate and N-vinylethyleneamine; maleimides or derivatives thereof such as maleimide and N-acetoxymethyl maleimide; sulfur-containing compounds such as vinyl thioether, vinyl thioacetate and vinyl sulfone; polycyclic hydrocarbons or vinyl compounds having heterocyclic ring(s) such as N-vinylpyridine and chlorovinylnaphthalene; silicon-containing compounds such as dimethyl siloxane and trichlorovinylsilane; phenols or derivatives thereof such as vinylphenol, or the like. These compounds may have various degrees of polymerization.

Among the monomers, oligomers and polymers listed above, the most preferred are silicone oil, polytetrafluoroethylenes, trifluorochloroethylene, allyltrifluoroacetylene, perfluorobutyl methacrylate, polyethylenes, polypropylenes, polyethylene terephthalates, polystyrenes, polycarbonates, adipic acid-hexamethylenediamine oligomers, polyparaxylenes and the like.

The monomers, oligomers and polymers used in accordance with the present invention may have any degree of polymerization. They should preferably be used in the liquid form. For example, such compounds may be prepared in the liquid form by the adjustment of the degree of polymerization. Alternatively, gaseous monomers or oligomers may be dissolved in liquid oligomers, or solid monomers or oligomers may be dissolved therein. Further, organic solvents may be used to form solutions of the monomers, oligomers and polymers described above.

The monomers or oligomers applied between the columnar grain structures in the magnetic layer may be irradiated with ionizing radiation, electromagnetic radiation or the like to promote the polymerization of such compounds. The ionizing radiation used for this purpose may be, e.g., electron beams (several hundred electron volts to several ten kiloelectron volts), ion beams (several ten electron volts to several ten kiloelectron volts), $\beta$-rays (several ten kiloelectron volts to several megaelectron volts), $\alpha$-rays (~several megaelectron volts) or the like. The electromagnetic radiation may, for example, be microwaves (wavelength: 1 mm to 1 m), ultraviolet rays (wavelength: 100 to 3,000Å), X-rays (wavelength: 0.01 to 100Å), $\gamma$-rays (wavelength: 0.0001 to 0.1Å) or the like. Further, neutron rays, proton rays or the like may also be used for this purpose. Some monomers and oligomers may be polymerized only with the aid of heat.

The magnetic recording layer of the present invention should preferably have saturation flux value per unit length ($\phi m$: saturation flux density Bm multiplied by the thickness) within the range from 0.05 maxwell/cm to 1.5 maxwell/cm. This is because the magnetic recording medium should be thick enough to give a sufficient output but should be thin enough to allow satisfactory high-density recording.

The organic compounds used in the present invention may be polymerized in situ in the presence of a polymerization catalyst. The polymerization catalyst used for this purpose may be, e.g., a diacyl peroxide such as acetyl peroxide, lauroyl peroxide, stearoyl peroxide and benzoyl peroxide, a hydroperoxide, an azo compound such as 2,2'-azobisisobutyronitrile, or the like.

In impregnating the spaces between the columnar grain structures with a liquid organic compound in accordance with the present invention, a monomer or oligomer in the liquid form is applied to the magnetic metal thin film having the columnar grain structures and dried, if necessary. Ultrasonic waves may be directed onto the magnetic metal thin film to promote the penetration of the organic compounds into the space between the columnar grain structures. After the application of the organic compounds into the spaces between the columnar grain structures, the excess of the organic compounds above the grain structures should preferably be removed by use of an organic solvent or the like. This is because a thick organic layer on the magnetic metal thin film can result in a space loss due to the thickness of the organic layer and adversely affect the electromagnetic transducing characteristics of the magnetic recording medium. The amount of the organic compound contained in the magnetic metal thin film layer cannot be defined absolutely. In general, however, the amount thereof will be 0.5 to 1,000 mg/m$^2$.

As described above, organic solvents may be used when applying the organic compound to the magnetic metal thin film in accordance with the present invention. Examples of the organic solvents which may be used for this purpose are ketones such as acetone, methyl ethyl ketone, methyl isobutyl ketone, and cyclohexanone; alcohols having from 1 to 10 carbon atoms, such as methyl alcohol, ethyl alcohol, propyl alcohol, and butyl alcohol; esters such as methyl acetate, ethyl acetate, butyl acetate, ethyl lactate, and glycol acetate monoethyl ether; ethers such as ethyl ether, ethylene glycol dimethyl ether, ethylene glycol monoethyl ether, and dioxane; aromatic hydrocarbons such as benzene, toluene, and xylene; chlorinated hydrocarbons such as methylene chloride, ethylene chloride, carbon tetrachloride, chloroform, ethylene chlorohydrin, and dichlorobenzene, or the like.

A lubricant or an antifungal agent may also be introduced between the columnar grain structures together with the monomer or oligomer in the liquid form, if necessary. The lubricant may be of the type described, e.g., in Japanese Unexamined Patent Publication Nos. 50(1975)-114205 (U.S. Pat. No. 3,993,824), 50(1975)-136009, 52(1977)-70811, 52(1977)-108804, 53(1978)-19004, 53(1978)-24806, 53(1978)-42706, 53(1978)-42707, 54(1979)-11703, 54(1979)-14711 and 54(1979)-21806. The antifungal agents which can be used in the present invention are described, e.g., in Japanese Patent Application No. 54(1979)-26880.

The present invention will further be illustrated by the following nonlimitative examples.

EXAMPLE 1

A cobalt magnetic film (thickness: $0.2\mu$) was obliquely deposited upon a $20\mu$-thick polyethylene terephtalate film to form a magnetic tape. The oblique deposition was conducted using an electron beam evaporation source charged with 99.95% pure cobalt in a vacuum of $5 \times 10^{-5}$ Torr at an incident angle of 70°.

Observation with a scanning electron microscope revealed that the columnar grain structures were formed on the substrate film and that the longitudinal axes of the columnar grain structures were at an angle of 50° with respect to a line perpendicular to the surface of the substrate film. The volumetric ratio of the spaces between the columnar grain structures was 20%. On the thus obtained magnetic tape was applied a solution of 20 parts by weight of spiroacetal oligomer, 5 parts by weight of vinilidene chloride-acrylonitrile copolymer and 0.7 part by weight of stearic acid (lubricant) in 1250 parts by weight of methyl ethyl ketone. In this way, the solution was applied between the columnar grain structures in the magnetic tape so that the dry weight would be 50 mg/m$^2$. After the solution had dried completely, it was exposed to an electron beam at a dose of 5 Mrad and a current of 3mA to polymerize the spiroacetal oligomer. The magnetic tape treated as described above was designated as specimen No. 11. Another specimen (No. 12) was prepared as a control in the same way as described above, except that the treatment according to the present invention was not effected.

EXAMPLE 2

An Fe-V alloy magnetic film (5 wt. % V, thickness $0.25\mu$) was obliquely deposited on a $12\mu$-thick polyethylene terephthalate film at an incident angle of 75°. In this way, a thin magnetic metal film having columnar grain structures was formed on the substrate film so as to obtain a magnetic tape. The longitudinal axes of the columnar grain structures were at an angle of 62° with respect to a line perpendicular to the surface of the substrate film. The volumetric ratio of the spaces between the columnar grain structures was 35%. On the other hand, 20 parts by weight of an acrylate-based oligomer (Aronics 610 available from Toa Gosei Chemical Industry Co., Ltd., Japan) and 0.1 part by weight of silicone oil were dissolved in methyl ethyl ketone to form a solution with a concentration of about 1%. This solution was then applied between the columnar grain structures in the previously prepared magnetic tape in such an amount that the dry weight was 75 mg/m$^2$. During this application, the solution was irradiated with an ultrasonic wave. After the solution had dried completely, it was exposed to an electron beam at a dose of 5 Mrad and a current of 3mA to polymerize the acriplate based oligomer. The magnetic tape treated as described above was designated as specimen No. 21. Another specimen (No. 22) was also prepared in the same way as described above, except that the treatment according to the present invention was omitted.

COMPARATIVE EXAMPLE

A cobalt magnetic film was electrolessly plated to a thickness of $0.2\mu$ on a $12\mu$-thick polyethylene terephthalate film as described below:

(1) Alkali etching: For 10 minutes at 80° C. in an aqueous 5 mol/liter sodium hydroxide solution.
(2) Washing with water
(3) Sensitizing: Using a sensitizer liquid containing 10g of $SnCl_2 \cdot 2H_2O$ and 30ml of HCl per liter.
(4) Washing with water
(5) Activating: Using an activator liquid containing 0.25g of $PdCl_2$ and 10ml of HCl per liter.
(6) Washing with water
(7) Ekectroless plating
Composition of plating liquid:
$CoCl_2 \cdot 6H_2O$: 9.5 g/liter
$NaH_2PO_2 \cdot H_2O$: 5.3 g/liter
$NH_4Cl$: 10.7 g/liter
Citric acid: 26.5 g/liter
Boric acid: 30.9 g/liter
Plating conditions:
pH 7.5, 5 minutes at a liquid temperature of 80° C.
(8) Washing with water and drying.

Observations with a scanning electron microscope revealed that the thin magnetic film formed had no columnar grain structures but that it consisted of nearly spherical grains crowded together with no spaces therebetween. The magnetic tape thus obtained was treated in the same ways as described in Examples 1 and 2 above to obtain specimen Nos. 31 and 32. For specimen No. 33, the treatment according to the present invention was omitted.

Thereafter, durability tests were conducted on the specimens obtained in the examples and comparative example described above. In the durability tests, 0.5-inch wide magnetic tapes were reciprocated 0, 10 and 50 times, respectively, at a speed of 3.3 cm/second under a tension of 90 g/0.5 inch in a VHS system video tape recorder. Then, the specimens were checked fro flaws and the still frame reproducing time was measured. The test results were as shown in Table 2 below.

TABLE 2

| | Durability | | | | | |
|---|---|---|---|---|---|---|
| | Original | | After 10 runs | | After 50 runs | |
| Specimen | Flaw | Still | Flaw | Still | Flaw | Still |
| No. 11 | | 15' | O | 20' | O | 15' |
| No. 12 | XX | 10" | XXX | Not measurable | XXX | Not measurable |
| No. 21 | | 20' | | 15' | | 15' |
| No. 22 | XX | 30" | XXX | 5" | XXX | Not measurable |
| No. 31 | O | 2' | X | 30" | XX | Not measurable |
| No. 32 | O | 1' | XXX | Not measurable | XXX | Not measurable |
| No. 33 | X | 30" | XXX | Not measurable | XXX | Not measurable |

= No flaws
O = No deep flaws, two or less shallow flaws for entire length
X = Deep flaws
XX = Many deep flaws
XXX = Scraped off almost entirely
"Not measurable" in the "still" column in Table 2 means that the reproduced image could not be obtained due to the existence of so many flaws on the deposited magnetic layer that the still frame reproduction test could not be conducted.

As is clear from the test results shown in Table 2, the thin metal film type magnetic recording medium according to the present invention (specimen Nos. 11 and 21) exhibited remarkably improved durability. In addition, the effect of improved durability was retained over a long period of time. Accordingly, the magnetic recording medium of the present invention is extremely practical.

I claim:

1. A method of preparing a magnetic recording medium which comprises vapor-depositing a thin ferromagnetic metal film having spaced-apart columnar grain structures onto a substrate, impregnating the spaces between the columnar grain structures with at least one organic monomer or oligomer in the liquid form, and polymerizing said at least one monomer or oligomer at least in the spaces between the columnar grain structures, whereby the resulting polymer is integrated with said thin ferromagnetic metal film.

2. A method of preparing a magnetic recording medium as defined in claim 1 wherein said vapor deposition is effected by the oblique incidence deposition process.

3. A method of preparing a magnetic recording medium as defined in claim 2 wherein the incident angle of the vapor stream of the ferromagnetic metal is 50° or more.

4. A method of preparing a magnetic recording medium as defined in claim 1 wherein said thin ferromagnetic metal film has a thickness within the range from 0.05 to 2μ.

5. A method of preparing a magnetic recording medium as defined in claim 4 wherein said thin ferromagnetic metal film has a thickness within the range from 0.1 to 0.4μ.

6. A method of preparing a magnetic recording medium as defined in claim 1 wherein the volumetric ratio of the spaces between said columnar grain structures in said thin ferromagnetic metal film is from 10% to 60%.

7. A method of preparing a magnetic recording medium as defined in claim 1 wherein the magnetic recording layer has a saturation flux value per unit length within the range from 0.05 to 1.5 maxwell/cm.

8. A method of preparing a magnetic recording medium as defined in claim 1 wherein an ultrasonic wave is directed onto said thin ferromagnetic metal film during the application of said at least one monomer or oligomer.

9. A method of preparing a magnetic recording medium as defined in claim 1 wherein a radiation is used to promote polymerization.

10. A method of preparing a magnetic recording medium as defined in claim 1 wherein the polymerization is effected in the presence of a polymerization catalyst.

11. A method of preparing a magnetic recording medium as defined in claim 1 wherein said organic polymer is formed by at least one compound selected from the group consisting of silicone oil, polytetrafluoroethylenes, trifluorochloroethylene, allyltrifluoroacetylene, perfluorobutyl methacrylate, polyethylenes, polypropylenes, polyethylene terephthalates, polystyrenes, polycarbonates, adipic acid-hexamethylenediamine oligomers, and polyparaxylenes.

12. A method of preparing a magnetic recording medium as defined in claim 1 wherein said organic polymer contains a lubricant.

13. A magnetic recording medium as defined in claim 1 wherein said organic polymer is formed in the spaces between, not above, the columnar grain structures.

14. A method of preparing a magnetic recording medium as defined in claim 1, wherein the monomer or oligomer is polymerized in the spaces between the columner grain structures, but not above said grain structures.

* * * * *

UNITED STATES PATENT AND TRADEMARK OFFICE
CERTIFICATE OF CORRECTION

PATENT NO. : 4,588,656

DATED : May 13, 1986

INVENTOR(S) : Tatsuji Kitamoto et al.

It is certified that error appears in the above-identified patent and that said Letters Patent is hereby corrected as shown below:

The term of this patent subsequent to November 8, 2000 has been disclaimed.

Signed and Sealed this

Twenty-second Day of September, 1987

Attest:

DONALD J. QUIGG

Attesting Officer     Commissioner of Patents and Trademarks